March 25, 1941.   L. C. SCHULZ   2,235,904
SEAT TRACK
Filed April 4, 1938
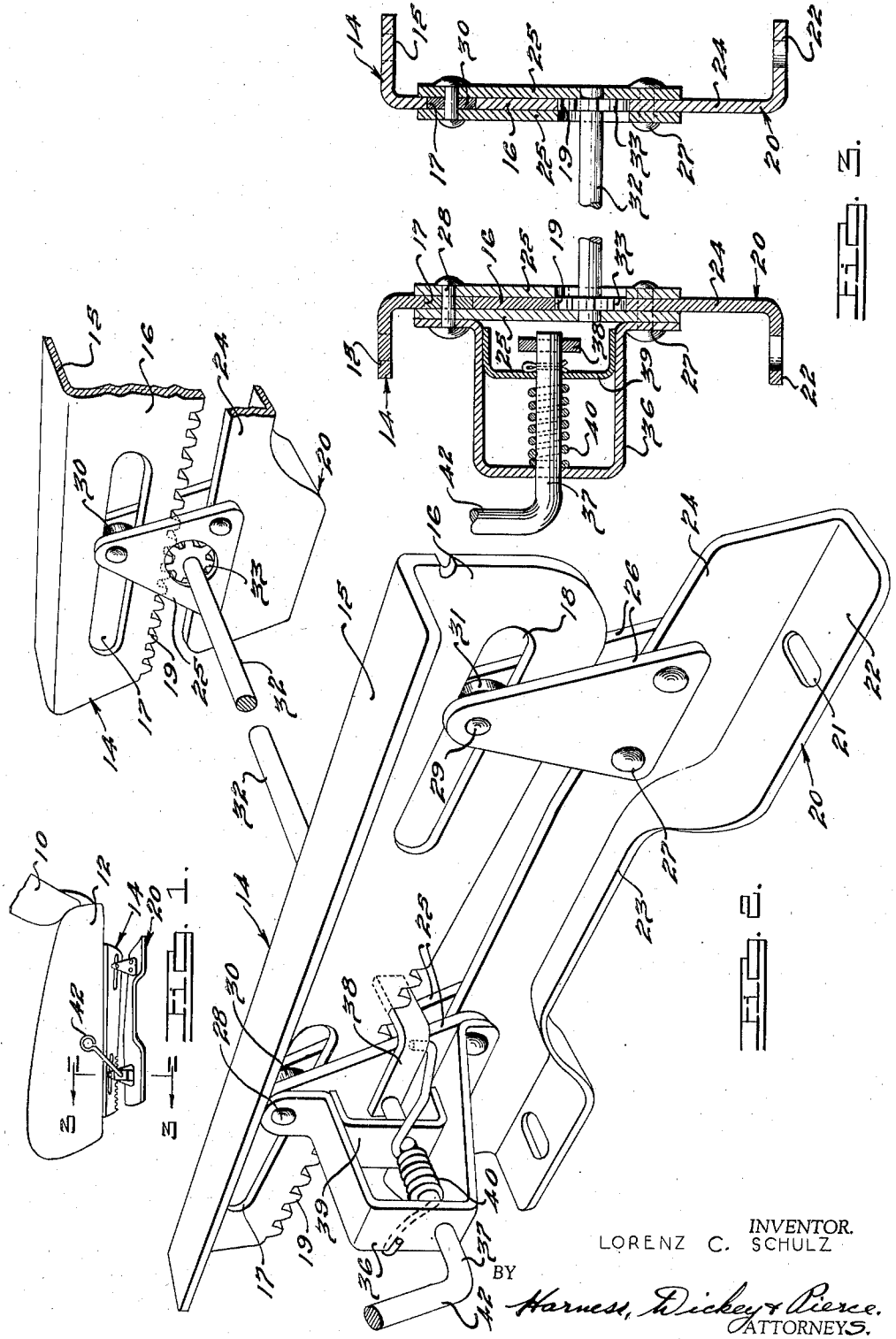
INVENTOR.
LORENZ C. SCHULZ
BY
Harness, Dickey & Pierce.
ATTORNEYS.

Patented Mar. 25, 1941

2,235,904

UNITED STATES PATENT OFFICE 2,235,904

SEAT TRACK

Lorenz C. Schulz, Detroit, Mich., assignor to The Murray Corporation of America, Detroit, Mich., a corporation of Delaware Application April 4, 1938, Serial No. 199,875

2 Claims. (Cl. 155—14)

The present invention relates to an adjustable front or driver's seat for an automobile or the like and the invention is an improvement upon the adjustable support disclosed in applicant's prior co-pending application Serial No. 196,593, filed March 18, 1938.

It is the general object of the invention to provide an improved supporting and adjusting mechanism for the front seat of an automobile in which the seat may be adjusted fore and aft in the vehicle and such adjustments will automatically lower or raise the seat with respect to the floor of the vehicle.

Another object of the invention is to provide an adjustable front seat of the type mentioned having means to prevent fore and aft movement of one side of the seat independently of the opposite side and consequent jamming of the seat on its supporting mechanism.

A further object of the invention is to provide a construction of the type mentioned which is simple, rugged, inexpensive to manufacture and easy to operate.

Other objects and advantages of the invention will become apparent from the following specification, the drawing relating thereto, and the appended claims.

In the drawing:

Fig. 1 is a fragmentary end view of the adjustable seat of the present invention;

Fig. 2 is a fragmentary perspective view of the adjustable supporting mechanism for the seat;

Fig. 3 is a section taken on the line 3—3 of Fig. 2.

Referring to the drawing, the seat proper comprises a back portion 10 and a seat portion 12 of the usual or any desired construction. It is contemplated that the seat will be of sufficient width to accommodate two passengers, one of which will be the driver of the vehicle. The seat portion 12 is provided with a pair of identical parallel angle members indicated generally at 14. The angle members 14 are provided with horizontal flanges 15, by means of which they may be secured to the seat 12, and with downwardly extending flanges 16, each of which is provided with a pair of spaced downwardly and rearwardly inclined slots 17 and 18. The bottom edge of flange 16 is provided with rack teeth 19 for a purpose to be described hereinafter.

A pair of suporting members, indicated generally at 20, of generally angular formation are provided for supporting the seat. Supporting members 20 may be fixedly secured in any desired manner to the floor of the vehicle, as by suitable bolt openings 21 in the horizontal flange 22 of the member. Preferably, the supporting member 20 has an upwardly offset portion 23 intermediate its ends to facilitate proper seating of the member on the floor of the vehicle. The upstanding flange 24 of each member 20 is provided with two pairs of bracket members 25 and 26, the brackets of each pair being positioned on opposite sides of the upstanding flange 24 and secured thereto in any suitable manner, such as by rivets 27. The bracket members 25 and 26 project upwardly on opposite sides of downwardly extending flange 16 of member 14 and carry at their upper ends rivets or shafts 28 and 29 upon which are journaled, intermediate the brackets of each pair, rollers 30 and 31 which engage respectively in slots 17 and 18 of the flange 16 on angle member 14. It is apparent that by reason of this arrangement the angle members 14 with the seat to which they are secured may be shifted upon rollers 30 and 31 fore and aft of the vehicle. The limit of such movement is determined by the length of the slots 17 and 18 and it will be noted that, by reason of the downward and rearward inclination of slots 17 and 18, rearward movement of the seat will be accompanied by a slight elevation thereof. This is essential in order to position the driver in proper relation to the controls of the vehicle.

A shaft 32 which extends entirely across the seat is journaled at its ends in the outermost brackets 25 of the pairs of brackets at the forward end of supporting members 20, as best shown in Fig. 3. A pair of pinions 33 are fixedly secured upon shaft 32 and engage the rack teeth 19 to prevent movement of one angle member 14 relative to its supporting member 20 independently of the other angle member 14. This arrangement, therefore, prevents cocking of the seat and consequent jamming of flanges 16 between the upstanding brackets 25 and 26.

Means are provided for releasably latching the seat in any desired adjusted position. This means comprises a bracket 36 secured to the outermost bracket 25 of the left hand pair of brackets 25 upon which is journaled a shaft 37 having a latching device 38 secured at its inner end and adapted to engage the rack teeth 19. A reinforcing bracket 39 is provided for rotatably supporting the inner end of shaft 37 and a spring element 40 is provided upon shaft 37 for normally urging the latch 38 into engagement with the rack teeth 19. A handle 42 is provided upon the outer extremity of shaft 37 for operating the shaft to release the latch when desired.

When it is desired to shift the seat 12, the handle 42 is swung clockwise and the seat pushed in the desired direction until the proper position is reached, whereupon the handle 42 is released and spring 40 latches the seat in adjusted position. When the seat is shifted rearwardly, it raises slightly by reason of the inclination of slots 17 and 18, thus maintaining the proper relation between the driver and the vehicle controls. The construction is particularly adapted for operation by the driver while he is occupying the seat, since by releasing the latch and pushing with his feet on the floor in the proper direction the driver can readily shift the seat on rollers 30 and 31. In that event no difficulty can arise by reason of the fact that the shifting force is all applied at one side or end of the seat because rack teeth 19, pinions 33 and shaft 32 insure that the seat will always shift by equal amounts at both sides.

While only one form of the invention is shown and described herein, it will be understood that others are available within the spirit of the invention and the scope of the appended claims.

What is claimed is:

1. In combination, a seat having elements having a pair of spaced parallel longitudinally extending flanges projecting downwardly therefrom, each of said flanges having a longitudinally extending slot therein, and rack teeth on the downwardly extending edges of the flanges, a supporting means for each of said flanges comprising upstanding elements extending on opposite sides of each of said flanges, a shaft journalled in said supporting means, pinions carried by said shaft engaging said rack teeth, rollers journalled on said upstanding elements and positioned in said slots for rolling engagement with the walls thereof, and a latch engageable with the rack teeth of one of said flanges for latching said seat in adjusted position.

2. In combination, a seat having a pair of spaced parallel longitudinally extending elements having flanges projecting downwardly therefrom, each of said flanges having a longitudinally extending slot therein, rack teeth on the edges of each of said flanges, a pair of upstanding flanges aligned with said first flanges, upstanding elements secured to said second named flanges and extending on opposite sides of each of said second pair of flanges, a shaft journalled in said upstanding elements, pinions carried by said shaft engaging said rack teeth, rollers journalled on each of said upstanding elements and positioned in said slots for rolling engagement with the walls thereof, and a latch engageable with the rack teeth on one flange for preventing movement of the downwardly extending flanges relative to said upstanding flanges when adjusted.

LORENZ C. SCHULZ.